April 5, 1955  A. E. IDE  2,705,563
OIL FILTER CARTRIDGE
Filed Nov. 12, 1952  3 Sheets-Sheet 2

INVENTOR.
Albert E. Ide
BY Victor J. Evans & Co
ATTORNEYS

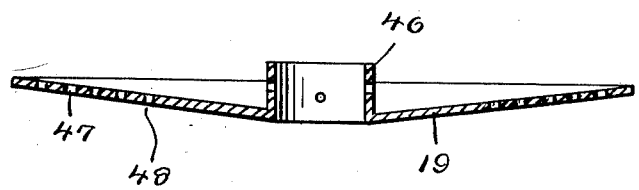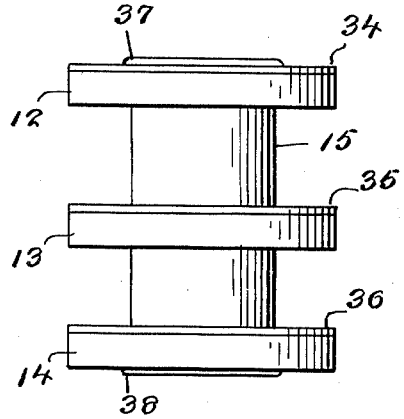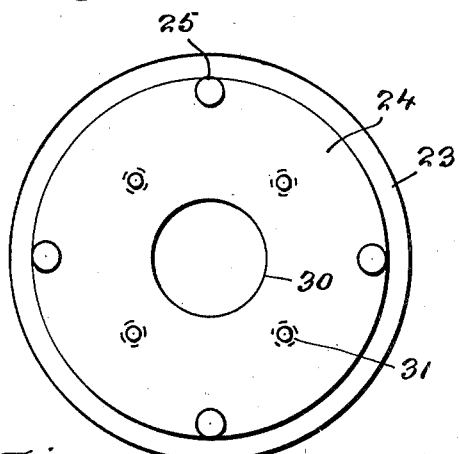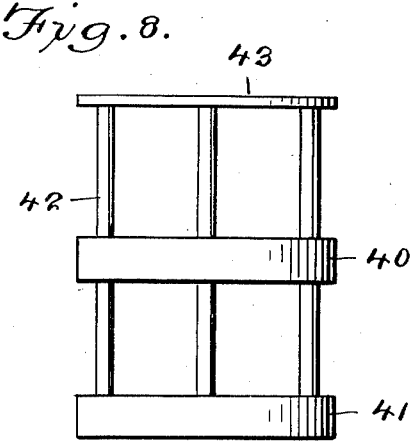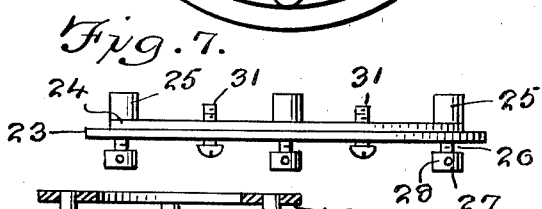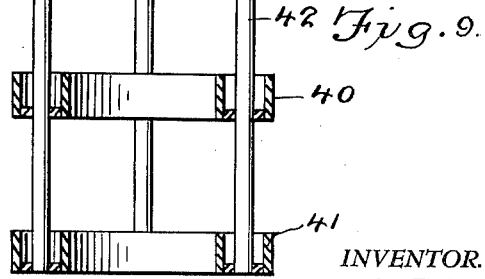

United States Patent Office 2,705,563
Patented Apr. 5, 1955

2,705,563

OIL FILTER CARTRIDGE

Albert E. Ide, Exeter, R. I.

Application November 12, 1952, Serial No. 319,891

3 Claims. (Cl. 210—1.5)

This invention relates to devices for cleaning and filtering oil of internal combustion engines, and in particular a cartridge for an oil filter having an outer cylindrical casing with a centrally disposed tubular post in which the cartridge is formed to slide over the post and wherein filtering elements and magnets incorporated in the cartridge remove foreign matter such as metal particles, gummy substances, grit, sediment, water and gasoline from the oil as it passes through the filter.

The purpose of this invention is to provide means in an oil filter for removing substantially all foreign matter from oil of an internal combustion engine.

It is generally conceded that lubricating oils particularly used in internal combustion engines do not break down and that the loss of efficiency of such oils is due to dilution of the oil with gasoline and also from foreign matter assimilated in the oil in the circulation thereof through passages and operating parts of an engine. With this thought in mind this invention contemplates filtering means wherein oil circulated through an internal combustion engine or other engine is thoroughly cleaned and substantially restored to its original condition.

The object of this invention is, therefore, to provide means for incorporating means in an oil filter for removing substantially all foreign matter and particularly metal particles, grit and diluting liquids.

Another object of the invention is to provide an improved filtering element including a magnet for attracting metal particles in which the element is adapted to be inserted in a conventional filter.

A further object of the invention is to provide an improved cartridge for an oil filter which includes magnets, filtering material, and a liquid arresting element, in which the cartridge is of a simple and economical construction.

With these and other objects and advantages in view the invention embodies a perforated housing having spaced magnets therein, a hollow circular container having openings in the upper surface for receiving water, gasoline, and the like and a plurality of filtering discs positioned above the magnet housing and carried by a tube adapted to be placed over a center tubular post of a conventional oil filter housing.

Other features and advantages of the invention will appear from the following description taken in connection with the drawings, wherein:

Figure 4 is a vertical section through one of the filtering discs illustrating the perforations in the outer part thereof.

Figure 5 is an elevational view illustrating the magnet unit of the type used in the cartridge shown in Fig. 1.

Figure 6 is a plan view of a cap or base plate secured to the lower end of the cartridge.

Figure 7 is a side elevational view of the base plate shown in Fig. 6.

Figure 8 is a side elevational view showing a modification and illustrating a magnet assembly of a different type.

Figure 9 is a vertical section through the magnet assembly shown in Fig. 8.

Figure 1:
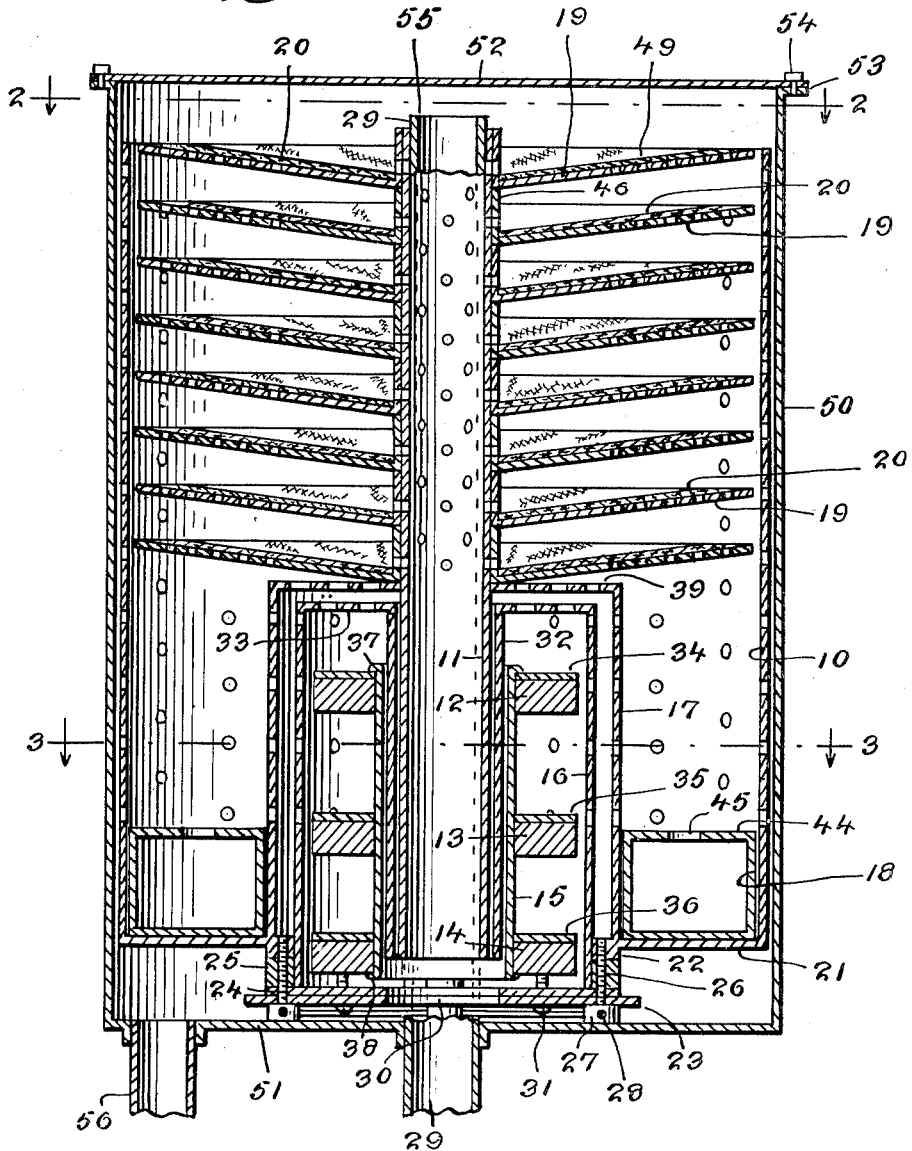
Figure 1 is a vertical section through an oil filter showing the improved filtering cartridge therein.
Figure 2:
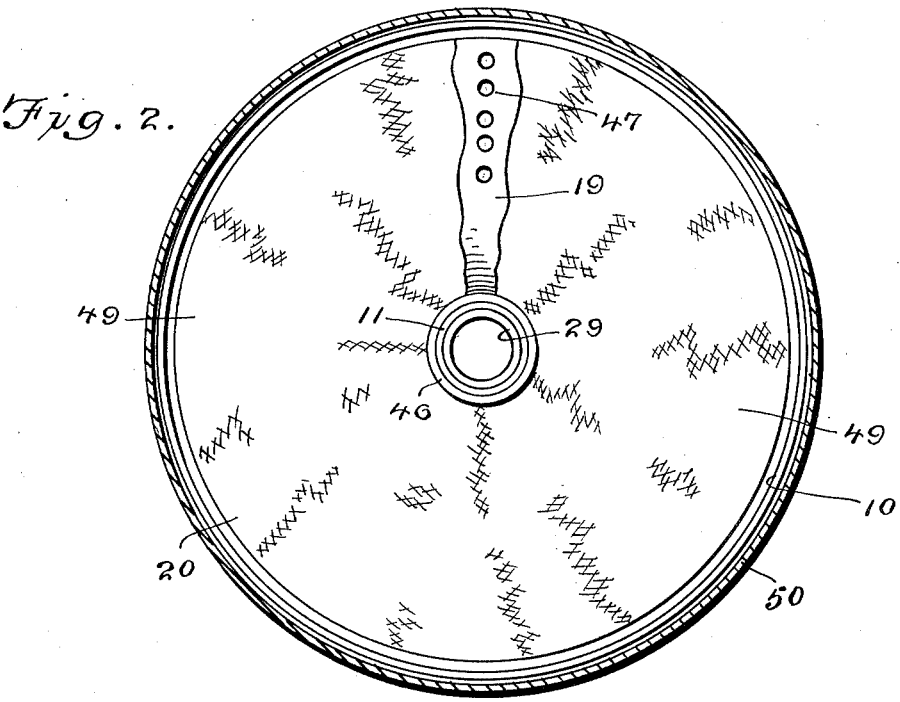
Figure 2 is a sectional plan through the upper part of the filter taken on line 2—2 of Fig. 1.
Figure 3:
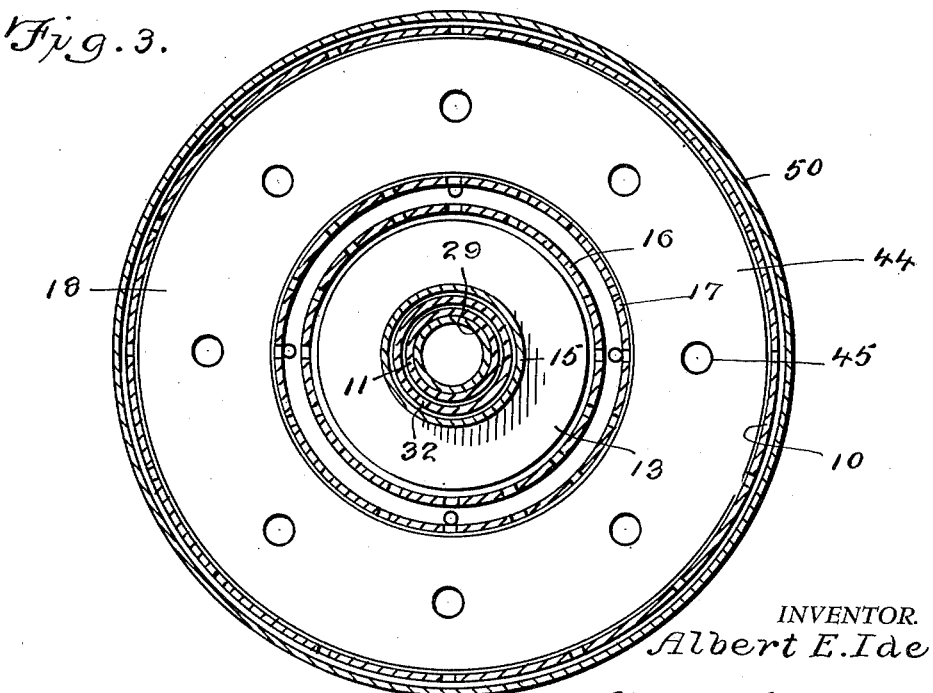
Figure 3 is a sectional plan through the lower part of the filter taken on line 3—3 of Fig. 1.

Referring now to the drawings wherein like reference characters denote corresponding parts the improved oil filter cartridge of this invention includes a perforated outer cylindrical casing 10, a centrally positioned tube 11, concentric with the outer casing, magnets 12, 13, and 14 carried by a tube 15 and positioned in a housing having an inner perforated wall 16 and an outer perforated wall 17, a hollow liquid arresting ring 18 and a plurality of discs 19 with filtering elements 20 positioned on the upper surfaces.

The cylindrical casing 10 is provided with a bottom 21 having an annular reinforcing ring 22 at the inner edge thereof with the ring 22 nested against the outer surface of the inner housing 16. The lower end of the magnet housing is substantially closed with a disc 23 that provides an extended flange, and also a disc 24 which carries spacing elements 25 which provide open circulating areas at the lower end of the magnet housing. Screws 26 having heads 27 with wire locking openings 28 therethrough extend through the discs 23 and 24 and spacing elements or lugs 25 and the screws are threaded into the annular ring 22 thereby securing the base to the lower end of the cylindrical casing 10.

The discs 23 and 24 are provided with centrally disposed openings through which a tubular post 29 extends, as shown in Fig. 1, the openings in the discs being indicated by the numeral 30.

The discs 23 and 24 are also provided with adjusting screws 31 that are positioned to engage the lower surface of the lower magnet 14 thereby providing means for adjusting the magnet assembly so that it is freely positioned in the inner magnet housing 16 with the tube or sleeve 15 positioned over and spaced from a sleeve 32 which forms the inner wall of the inner magnet housing. The upper end of the sleeve 32 is connected to the housing 16 with a perforated disc 33. The magnets 12, 13, and 14 are also provided steel retainer rings 34, 35, and 36, respectively and the magnets are secured to the rings by suitable means. The parts are secured in assembled relation by peening over the ends of the tube 15 as shown at the points 37 and 38.

The upper end of the outer magnet housing 17 is connected to the tube 11 with a perforated disc 39 and the lower end of the housing is secured to the base 21 of the perforated cylinder 10.

The magnet assembly may also be formed as illustrated in Figs. 8 and 9 in which spaced rings 40 and 41, which are U-shaped in cross section, are secured to radially disposed stems 42, the upper ends of which are secured to a steel retainer 43. It will be understood that the magnet assembly may be provided in different forms and as many magnets as may be desired may be used.

The hollow ring 18, the upper wall 44 of which is provided with openings 45 is freely positioned in the lower end of the cartridge, the ring being located between the outer surface of the outer magnet housing 17 and the inner surface of the perforated cylinder 10. With the ring positioned in this manner water and other foreign liquids suspended in the oil pass by gravity, through the openings 45 and into the open area in the ring 18 and are trapped therein.

The discs 19, which extend from the upper surface of the disc 39 of the magnet housing to the upper end of the cartridge are provided with hubs 46 from the lower ends of which the webs of the discs extend and, as shown, particularly in Fig. 4, the outer areas of the discs are provided with perforations 47. The perforated sections extend from points substantially midway between the centers and peripheries of the discs, to the outer edges of the discs, and the hubs 46 of the discs are provided with openings 48 that register with corresponding openings in the tubes 11 and 29.

The upper surfaces of the disc 19 are covered with a layer of filtering material, such as filter paper or fiber, the filtering material being indicated by the numeral 49.

With the parts formed in this manner the filtering cartridge is complete, and as illustrated in Fig. 1 the cartridge is adapted to be inserted into the housing of a conventional oil filter of the type having a cylindrical outer wall 50, a bottom 51 and a cover plate 52. The cover plate 52 is secured to a flange 53 at the upper end of the housing with screws 54. The filter housing 50 is provided with a conventional tubular outlet post as indicated by the numeral 29 which extends upwardly through the center of the filter to a point 55, spaced from the upper end. The filter may also be provided with an inlet tube as indicated by the numeral 56, and it will be understood that the inlet tube may be positioned at a suitable point.

The cartridge of this invention is adapted to be removed, cleaned and replaced in the filter housing, or the cartridge may be discarded and replaced with a new cartridge as may be desired.

With the cartridge inserted in a housing of a conventional filter, oil passing into the housing through the inlet connection 56 percolates upwardly around the parts, passing through the magnet housing 16 and through the perforated outer wall 17 from which the oil passes upwardly around the discs, whereby minerals or other materials having magnetic attraction are arrested by the magnets in the inner housing 16 with foreign matter, such as water, the specific gravity of which is heavier than that of the oil passing downwardly through the openings 45 into the arresting ring 18 in which water and other foreign materials are trapped and from the lower part of the housing the oil passes upwardly with sediment still remaining therein being deposited upon the discs and running inwardly toward the center and with the substantially clean liquid flowing downwardly through the tube 29 from the upper end 55.

By this means an improved filter is provided with which substantially all foreign matter may be removed from oil and particularly oil of an internal combustion engine.

It will be understood that other modifications within the scope of the appended claims, may be made in the design and arrangement of the parts without departing from the spirit of the invention.

What is claimed is:

1. An oil filter cartridge comprising a cylindrical casing, an outlet tube extended through the lower end of the casing and upwardly to a point spaced above the upper end of the casing, an inlet tube extended through the lower end of the casing in spaced relation to said outlet tube, a plurality of spaced horizontally disposed discs having perforations in the outer areas thereof positioned around said outlet tube and sloping upwardly from the outlet tube to the peripheral edges thereof, a disc shaped filtering element positioned on the upper surface of each of said discs, a hub on each disc for spacing the discs in relatively spaced relation to each other, an enclosed annular trap having openings in the upper surface positioned in the lower end of the casing, and a plurality of spaced magnets positioned around the outlet tube for arresting particles suspended in oil passing through the filter in which the particles have magnetic attraction.

2. In an oil filter, the combination which comprises a cylindrical housing having a closed lower end with a cover positioned on the upper end, an inlet connection positioned in the closed lower end of the housing, an outlet tube extended through the lower end of the housing and upwardly to a point spaced from the cover of the housing, an inner cylindrical casing positioned in the housing and through which the outlet tube extends, a plurality of spaced horizontally disposed discs having perforations in the outer areas thereof positioned around said outlet tube and sloping upwardly from the outlet tube to the peripheral edges thereof, the peripheral edges of the discs being spaced inwardly from the inner casing, a disc shaped filtering element positioned on the upper surface of each of said discs, a hub on each disc for spacing the discs in relatively spaced relation to each other, an inner perforated casing positioned around the lower part of said outlet tube, spaced magnets in said casing, and an annular container with openings in the upper surface positioned in the lower end of said inner casing.

3. In an oil filter, the combination which comprises a cylindrical housing having a closed lower end with a cover positioned on the upper end, an inlet connection positioned in the closed lower end of the housing, an outlet tube extended through the lower end of the housing and upwardly to a point spaced from the cover of the housing, an inner cylindrical casing positioned in the housing and through which the outlet tube extends, a plurality of spaced horizontally disposed discs having perforations in the outer areas thereof positioned around said outlet tube and sloping upwardly from the outlet tube to the peripheral edges thereof, the peripheral edges of the discs being spaced inwardly from the inner casing, an inner perforated casing positioned around the lower part of said outlet tube, and spaced magnets positioned in the inner perforated casing.

References Cited in the file of this patent

UNITED STATES PATENTS

| | | |
|---|---|---|
| Re. 13,053 | Paul | Dec. 7, 1909 |
| 685,881 | Theurer | Nov. 5, 1901 |
| 1,202,109 | Sellenscheidt | Oct. 24, 1916 |
| 1,602,935 | Rasey | Oct. 12, 1926 |
| 2,077,999 | Hurn | Apr. 20, 1937 |
| 2,327,803 | Kidd | Aug. 24, 1943 |
| 2,437,221 | Cox et al. | Mar. 2, 1948 |
| 2,508,666 | Frantz | May 23, 1950 |
| 2,583,963 | O'Meara | Jan. 29, 1952 |